(12) United States Patent
Hoheisel et al.

(10) Patent No.: US 6,980,629 B1
(45) Date of Patent: Dec. 27, 2005

(54) ANTISCATTER GRID OR COLLIMATOR, AND A METHOD OF PRODUCTION

(75) Inventors: Martin Hoheisel, Erlangen (DE); Martin Schaefer, Berlin (DE); Hartmut Sklebitz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 96 days.

(21) Appl. No.: 10/655,026

(22) Filed: Sep. 5, 2003

(30) Foreign Application Priority Data

Sep. 6, 2002 (DE) ................................ 102 41 424

(51) Int. Cl.⁷ ................. G21K 1/02; B29C 35/04; B29C 35/08
(52) U.S. Cl. ................. 378/149; 378/154; 264/401; 264/497
(58) Field of Search ................. 378/19, 98.8, 147, 378/149, 154, 155; 250/363.1, 370.09, 505.1; 264/401, 113, 227, 308, 497

(56) References Cited

U.S. PATENT DOCUMENTS

| 4,125,776 | A | * | 11/1978 | Tosswill et al. | ............ 378/149 |
| 5,231,655 | A | * | 7/1993 | Wei et al. | ................... 378/147 |
| 5,455,849 | A | * | 10/1995 | Logan et al. | ................ 378/154 |
| 5,581,592 | A | * | 12/1996 | Zarnoch et al. | ............. 378/154 |
| 6,309,581 | B1 | * | 10/2001 | Gervasi | ...................... 264/401 |
| 6,847,701 | B2 | * | 1/2005 | Hoheisel et al. | ............ 378/154 |
| 2003/0081731 | A1 | * | 5/2003 | Souchay et al. | ............ 378/154 |

* cited by examiner

Primary Examiner—Allen C. Ho
(74) Attorney, Agent, or Firm—Harness, Dickey & Pierce, P.L.C.

(57) ABSTRACT

A method is for producing an antiscatter grid or collimator for a radiation type, which is formed from a base body of predeterminable geometry having transmission channels for primary radiation of the radiation type which extend between two opposite surfaces of the base body. In the method, the base body is constructed by use of a rapid prototyping technique by layer-wise solidification of a structural material, which is substantially transmissive to the radiation type, under the action of radiation. Inner surfaces of the base body in the transmission channels are coated with a material, which strongly absorbs the radiation type, up to a layer thickness which suffices to virtually completely absorb incident secondary radiation of the radiation type. The opposite surfaces of the base body are not coated, or are aftertreated in such a way that they do not bear a coating or bear a coating of greatly reduced layer thickness made from the material strongly absorbing the radiation type. The method permits the simple production of an antiscatter grid or collimator with high primary beam transparency.

38 Claims, 3 Drawing Sheets

ANTISCATTER GRID OR COLLIMATOR, AND A METHOD OF PRODUCTION

The present application hereby claims priority under 35 U.S.C. §119 on German patent application number DE 10241424.6 filed Sep. 6, 2002, the entire contents of which are hereby incorporated herein by reference.

FIELD OF THE INVENTION

The present invention generally relates to a method for producing an antiscatter grid or collimator, in particular for x or gamma radiation. It further generally relates to an antiscatter grid or collimator which can be produced using the method.

BACKGROUND OF THE INVENTION

In radiography, stringent requirements are currently placed on the image quality of the x-ray images. In such images, as are taken especially in medical x-ray diagnosis, an object to be studied is exposed to x-radiation from an approximately point radiation source. Further, the attenuation distribution of the x-radiation is registered two-dimensionally on the opposite side of the object from the x-ray source. Line-by-line acquisition of the x-radiation attenuated by the object can also be carried out, for example in computer tomography systems.

Besides x-ray films and gas detectors, solid-state detectors are being used increasingly as x-ray detectors, these generally having a matricial arrangement of optoelectronic semiconductor components as photoelectric receivers. Each pixel of the x-ray image should ideally correspond to the attenuation of the x-radiation by the object on a straight axis from the point x-ray source to the position on the detector surface corresponding to the pixel. X-rays which strike the x-ray detector from the point x-ray source in a straight line on this axis are referred to as primary beams.

The x-radiation emitted by the x-ray source, however, is scattered in the object owing to inevitable interactions, so that, in addition to the primary beams, the detector also receives scattered beams, so-called secondary beams. These scattered beams, which, depending on the properties of the object, can cause up to 90% or more of the total signal response of an x-ray detector in diagnostic images, constitute an additional noise source and therefore reduce the identifiability of fine contrast differences. This substantial disadvantage of scattered radiation is due to the fact that, owing to the quantum nature of the scattered radiation, a significant additional noise component is induced in the image recording.

In order to reduce the scattered radiation components striking the detectors, so-called antiscatter grids are therefore interposed between the object and the detector. Antiscatter grids include regularly arranged structures that absorb the x-radiation, between which transmission channels or transmission slits for minimally attenuated transmission of the primary radiation are formed. These transmission channels or transmission slits, in the case of focused antiscatter grids, are aligned with the focus of the x-ray tube according to the distance from the point x-ray source, that is to say the distance from the focus. In the case of unfocused antiscatter grids, the transmission channels or transmission slits are oriented perpendicularly to the surface of the antiscatter grid over its entire area. However, this leads to a significant loss of primary radiation at the edges of the image recording, since a sizeable part of the incident primary radiation strikes the absorbing regions of the antiscatter grid at these points.

In order to achieve a high image quality, very stringent requirements are placed on the properties of x-ray antiscatter grids. The scattered beams should, on the one hand, be absorbed as well as possible. On the other hand, the highest possible proportion of primary radiation should be transmitted unattenuated through the antiscatter grid. It is possible to achieve a reduction of the scattered beam component striking the detector surface by a large ratio of the height of the antiscatter grid to the thickness or diameter of the transmission channels or transmission slits, that is to say by a high aspect ratio.

The thickness of the absorbing structure elements or wall elements lying between the transmission channels or transmission slits, however, can lead to image perturbations by absorption of part of the primary radiation. Specifically when solid-state detectors are used, inhomogeneities of the grids, that is to say deviations of the absorbing regions from their ideal position, cause image perturbations by projection of the grids in the x-ray image. For example, in the case of matricially arranged detector elements, there is a risk of projection of the structures of detector elements and antiscatter grids mutually interfering. Perturbing moiré phenomena can thereby arise.

A particular disadvantage of all known antiscatter grids is that the absorbing structure elements cannot be made arbitrarily thinly and precisely, so that a significant part of the primary radiation is always removed by these structure elements.

The same problem occurs in nuclear medicine, especially when using gamma cameras, for example Anger cameras. With this recording technique also, as with x-ray diagnosis, it is necessary to ensure that the fewest possible scattered gamma quanta reach the detector. In contrast to x-ray diagnosis, the radiation source for the gamma quanta lies inside the object in the case of nuclear diagnosis. In this case, the patient is injected with a metabolic preparation labeled with particular unstable nuclides, which then becomes concentrated in a manner specific to the organ. By detecting the decay quanta correspondingly emitted from the body, a picture of the organ is then obtained.

The profile of the activity in the organ as a function of time permits conclusions about its function. In order to obtain an image of the body interior, a collimator that sets the projection direction of the image needs to be placed in front of the gamma detector. In terms of functionality and structure, such a collimator corresponds to the antiscatter grid in x-ray diagnosis. Only the gamma quanta dictated by the preferential direction of the collimator can pass through the collimator, and quanta incident obliquely to it are absorbed in the collimator walls. Because of the higher energy of gamma quanta compared with x-ray quanta, collimators need to be made many times higher than antiscatter grids for x-radiation.

For instance, scattered quanta may be deselected during the image recording by taking only quanta with a particular energy into account in the image. However, each detected scattered quantum entails a dead time in the gamma camera of, for example, one microsecond, during which no further events can be registered. Therefore, if a primary quantum arrives shortly after a scattered quantum has been registered, it cannot be registered and it is lost from the image. Even if a scattered quantum coincides temporally—within certain limits—with a primary quantum, a similar effect arises.

Since the evaluation electronics can then no longer separate the two events, too high an energy will be determined and the event will not be registered. Both situations explain how highly effective scattered beam suppression leads to improved quantum efficiency in nuclear diagnosis as well. As the end result, an improved image quality is thereby achieved for equal dosing of the applied radionuclide or, for equal image quality, a lower radionuclide dose is made possible, so that the patient's beam exposure can be reduced and shorter image recording times can be achieved.

There are currently various techniques for producing antiscatter grids for x-radiation and collimators for gamma radiation. For instance, lamellar antiscatter grids are known, which are made up of lead and paper strips. The lead strips are used for absorption of the secondary radiation, while the paper strips lying between the lead strips form the transmission slits for the primary radiation. However, the limited precision when producing such antiscatter grids, as well as the fact that the thickness of the lead lamellae cannot be reduced further, entail, on the one hand, an undesired loss of primary radiation and, on the other hand, in the case of matricially arranged detector elements of a solid-state detector, problems in the image quality due to moiré stripes and/or grid stripes.

Collimators for gamma cameras are generally produced from mechanically folded lead lamellae. This is a relatively cost-efficient solution, although it has the disadvantage that, in particular when using solid-state cameras with matricially arranged detector elements, for example in the case of cadmium-zinc telluride detectors, perturbing aliasing effects can arise because the structure of these collimators is then relatively coarse.

For producing antiscatter grids for x-radiation, U.S. Pat. No. 5,814,235 A discloses a method in which the antiscatter grid is constructed from individual thin metal film layers. The individual metal film layers include a material that strongly absorbs the x-radiation, and they are photolithographically structured with corresponding transmission holes. To that end, a photoresist needs to be applied on both sides of the respective film and exposed through a photomask.

This is followed by an etching step, in which the transmission holes are etched into the film material. After the remaining photoresist layer has been removed, an adhesion layer is applied to the etched metal films. The metal films are then positioned exactly above one another and are joined together to form the antiscatter grid.

The structure is consolidated by a subsequent heat treatment. In this way, it is possible to produce cellular antiscatter grids with air gaps as transmission channels, which are suitable for applications in mammography and general radiography. In this case, the photolithographic etching technique permits more precise definition of the absorbing and nonabsorbing regions inside the antiscatter grid than is possible with lead lamellae. By using different masks from one metal film to another—in each case with transmission holes that are mutually offset slightly—it is also possible to produce focused antiscatter grids by using this technique. However, an antiscatter grid for x-radiation needs a large number of such metal film layers, which in turn require a large number of different masks and production steps. The method is therefore very time-consuming and cost-intensive.

U.S. Pat. No. 6,185,278 B1 discloses a further method for producing an antiscatter grid for x- and gamma rays, in which individual metal films are likewise photolithographically etched and laminated above one another. In this method, however, in order to produce a focused antiscatter grid, groups of metal film layers with exactly the same arrangement of the transmission holes are assembled together, and only the individual groups have transmission holes arranged mutually offset. This technique reduces the number of photolithographic masks necessary for producing the antiscatter grid.

A further method for producing an antiscatter grid for x-radiation is disclosed by U.S. Pat. No. 5,303,282. This method uses a substrate made of photosensitive material, which is exposed by using a photomask according to the transmission channels to be produced. The channels are then etched from this substrate according to the exposed regions. The surface of the substrate, as well as the inner walls of the transmission channels, are coated with a sufficient thickness of a material that absorbs the x-radiation. In order to increase the aspect ratio, a plurality of such prepared substrates are optionally stacked above one another. Similar production techniques for producing cellular antiscatter grids for x-radiation are described in EP 0 681 736 B1 or U.S. Pat. No. 5,970,118 A. Etching transmission channels into thicker substrates, however, leads to a loss of precision of the channel geometry.

The publication by G. A. Kastis et al., "A Small-Animal Gamma-Ray Imager Using a CdZnTe Pixel Array and a High Resolution Parallel Hole Collimator" discloses a method for producing a cellularly constructed collimator for gamma radiation. In this case as well, the collimator is produced from laminated layers of metal films, here made of tungsten, which are photochemically etched. This production method is therefore also very elaborate and cost-intensive.

Post-published DE 101 47 947 describes a method for producing an antiscatter grid or collimator using the technique of rapid prototyping. In this method, the geometry of the transmissive and the nontransmissive regions of the antiscatter grid or collimator is set first. Next, by way of a rapid prototyping technique through layer-wise solidification of a structural material under the action of radiation, a base body is constructed according to the geometry of the transmissive regions, and is coated with a material which strongly absorbs x or gamma radiation on the inner surfaces of the transmission channels formed and on the front and rear surfaces. The layer thickness is selected in this case such that incident secondary radiation is virtually completely absorbed in this layer.

By using a rapid prototyping technique when constructing the base body, very filigree structures can be produced with very high accuracy. The base body can be produced very simply in this way, without needing to perform a large number of elaborate method steps. In this method, the structures, particularly the intermediate walls or webs, forming the absorbing regions, between the transmission channels can be realized in a simple way with a thickness of approximately 60–200 $\mu$m. The production of intermediate walls with thicknesses below 60 $\mu$m continues, however, to require substantial outlay. On the other hand, absorbing intermediate walls with a thickness of 60–200 $\mu$m lead to an unfavorable primary beam transparency of the antiscatter grid or collimator.

SUMMARY OF THE INVENTION

An object of an embodiment of the present invention is to specify a method for producing an antiscatter grid or collimator, preferably with a high aspect ratio and increased primary beam transparency, which requires low manufacturing outlay. Furthermore, an embodiment of the present invention is intended to provide an antiscatter grid or collimator with high primary beam transparency which can be produced using the method.

In one alternative embodiment of the present method for producing an antiscatter grid or collimator for a radiation type, in particular for x-radiation or gamma radiation, which is formed from a base body of predeterminable geometry having transmission channels for primary radiation of the radiation type which extend between two opposite surfaces of the base body, after the setting of the geometry of the base body, this base body is constructed according to the set geometry by means of a rapid prototyping technique through layer-wise solidification of a structural material under the action of radiation. A material which is substantially transmissive to the radiation type for which the antiscatter grid or collimator is used is selected as structural material. After the completion of the base body, the inner surfaces, situated in the transmission channels, of the base body may be coated with a material, which strongly absorbs the radiation type, up to a layer thickness which suffices to virtually completely absorb incident secondary radiation of the radiation type. The opposite surfaces of the base body present outside the transmission channels may, in this case, either not be coated, or may be aftertreated in such a way that they do not bear a coating or bear a coating of greatly reduced layer thickness made from the material strongly absorbing the radiation type.

The second alternative embodiment of the present method differs from the first alternative solely in that the rapid prototyping technique is used not for constructing the base body but for constructing a molding from which the base body is formed by single or multiple replication. A material which is substantially transmissive to the radiation type is selected here too as material of the base body. The coating of the base body is performed in the same way as in the first alternative of the method.

By using a rapid prototyping technique when constructing the base body, very filigree structures can be produced with very high accuracy as in the case of the post-published document specified in the introduction. The base body can be produced very easily in this way, without needing to carry out a multiplicity of elaborate method steps. Thus, the overall production process, up until the finished antiscatter grid or collimator is obtained. Hence, it is greatly simplified by comparison with the other known methods of the prior art, and can be realized more cost-effectively.

The result of coating solely the inner surfaces of the base body in the transmission channels with the material which strongly absorbs the radiation type, and/or of removing, or greatly reducing the layer thickness of, this coating on the two mutually opposite surfaces of the base body, that is to say at the end faces of the intermediate walls of the antiscatter grid or collimator that are formed, is a substantially increased primary beam transparency. This is so since the material of the base body is substantially transmissive to the respective radiation type, that is to say the primary radiation is not attenuated or is so only to a slight extent, preferably only less than approximately 8% mm for mammographic applications and less than approximately 2% mm for radiographic applications. The primary beam transparency of the antiscatter grid or collimator is thus very slight even in the case of a thickness of the intermediate walls above 60 $\mu$m.

These intermediate walls form additional transmission channels for the radiation, and so the effective thickness of the nontransmissive regions of the antiscatter grid or collimator is given solely by the thickness of the absorbing layer in the transmission direction. In this way, antiscatter grids of size 24×30 cm$^2$ for mammography and of size 43×43 cm$^2$ in other fields of radiography can be realized with a very high primary beam transparency, for example using simple stereolithography as preferred rapid prototyping technique. A primary transparency not so far reached results from exposing or keeping free the end faces of the intermediate walls of the strongly absorbing layer. Consequently, it is also possible to use thicker wall thicknesses of the intermediate walls of the base body which are formed between the transmission channels. This is attended by a few additional advantages.

Thus, it is possible to use a more cost-effective stereolithographic apparatus to produce the antiscatter grid or collimator. This results in an enhanced reliability of fabrication, because small variations in the focal size of the laser can be tolerated more readily than in the case of very thin intermediate walls. Furthermore, a base body with thicker intermediate walls is of greater strength, and so the subsequent mounting steps are of a simpler nature and the lifetime of the antiscatter grid or collimator is increased.

Given the same center-to-center spacing of the transmission channels, the result is a greater suppression of the scattered radiation than in the realization with thinner intermediate walls, since the channels are narrower given thicker intermediate walls, and so the aspect ratio is increased. Again, the intermediate walls themselves act in the case of an antiscatter grid or collimator produced using the present method as an active part of the grid when the end faces are completely exposed. In this region, the aspect ratio is even increased further because of the wall thicknesses, which are thin by comparison with the diameter of the transmission channels, the result being a further rise in the grid selectivity.

In the rapid prototyping technique, 3D CAD designs, here the geometry of the base body, are converted into volume data in the CAD system. The 3D volume model for the rapid prototyping is then divided into cross sections in a computer. The cross sections have a layer thickness of 100 $\mu$m or less. After the data have been sent to a rapid prototyping system, the original shape is built up layer by layer. The present method in this case uses a rapid prototyping technique in which the layer construction is carried out by the action of radiation, in particular laser radiation. Laser radiation, specifically, offers the advantage of producing very filigree structures in this case.

The base body of the antiscatter grid or collimator may either be produced directly by the rapid prototyping process or from a molding, made using this process, by single or multiple replication. Suitable replication processes are known to the person skilled in the art, and can be carried out simply and cost-effectively.

The antiscatter grids or collimators that can be produced by the present methods may have arbitrary geometries of the transmissive regions for the scattered radiation, or secondary radiation, to be correspondingly absorbed. For instance, all the geometries known from the prior art, for example cellular structures or structures with slit transmission holes, may be produced. In particular, there is no difference in the production technology irrespective of whether focused or parallel antiscatter grids or collimators are produced. For producing antiscatter grids or collimators with a different focal length, no changes need to be made to any of the masks during production.

The production technique for producing an antiscatter grid for x-radiation is no different from the production technique for producing a collimator for gamma quanta. Merely the materials used for producing the base body and the absorbing coating may differ. Furthermore, a gamma collimator is produced with a height increased many times compared with an antiscatter grid for x-radiation.

In a preferred embodiment of the present method, the technique of stereolithography is used for constructing the base body or the molding. In this method, a computer-controlled UV laser beam forms the respective contours of the individual layers of the 3D volume model of the base body or molding on a liquid polymer resin. The resin is cured under the action of the laser at the exposed points or areas. The component platform of the system is then lowered, and a new thin layer of photopolymer resin is applied. By repeating these steps, the complete geometry of the base body is successively constructed from the bottom upward. The component produced in this way can then be further hardened and mechanically processed further.

Besides stereolithography as a rapid prototyping technique for making the base body or the molding, it is also possible to use the technique of microstereolithography. In this technique, each layer is exposed by single exposure by using a pattern, corresponding to the regions to be exposed. In this case, for example, micromirror arrays may be used for producing the patterns that differ from layer to layer, as is known from the prior art.

It is furthermore possible to use the method of selective laser sintering or laser melting for making the base body or molding. This technique involves a method of local fusion or melting of starting material in powder form by a CO2 laser. The material is built up layer-wise on a construction platform. The laser beam is controlled along the component cross section of the respective layer by using the data of the 3D volume model. The processing or solidification of a layer thickness of about 0.1 to 0.2 $\mu$m is carried out layer by layer. When the construction platform is lowered, the powder container provides the powder quantity for a further layer, and this is distributed using a corresponding leveler element. The energy delivered by the laser is absorbed by the powder and leads to local solidification of the material.

In an embodiment of the present method, a molding is constructed according to the geometry of the transmission channels. In this case, it is necessary to construct the molding on a support plate that can be removed from the construction platform, or to make this support plate as a constituent part of the molding by use of the rapid prototyping technique. The gaps resulting in the molding are subsequently filled with a material which is substantially transparent to the radiation type and which forms the base body after curing. The base body and molding are subsequently separated, and the base body is provided appropriately with the coating which strongly absorbs the radiation type.

In a further embodiment, a molding is constructed according to the geometry of the base body. This molding is subsequently replicated so that a negative mold is obtained. In this negative mold, corresponding to the previous exemplary embodiment, the gaps are then filled with a material which is substantially transparent to the radiation type, and the base body thereby produced is appropriately coated.

The coating with the material strongly absorbing the respective radiation type can be performed by sputtering, electroplating or vapor deposition, for example. The technique of sputtering has the particular advantage that the coating material is deposited very effectively even on the inner surfaces of the base body in the transmission channels. The technique of electroplating can be used, for example, in conjunction with sputtering. In this case, a conductive starting layer is applied by sputtering and is then thickened by the electroplating process. The use of an electrically conductive polymer as material of the base body is also possible with the present method, it then being possible for the coating to be applied directly by an electroplating process. It goes without saying that the present method is independent of the coating process respectively used. Rather, it is possible to make use of all the techniques known to the person skilled in the art and suitable for applying coating material on the inner surfaces of the base body in the transmission holes.

Keeping free or uncovering the two surfaces of the base body from the absorbing coating can be achieved by way of different measures. Thus, on the one hand, the deposition of the strongly absorbing material can be prevented during the coating process by masking these surfaces. This can be performed, on the one hand, by masking the surfaces to be kept free with the aid of movable masks or by applying a coat which can subsequently be removed, for example a layer which can be removed thermally or chemically. However, it is preferred for the coating to be applied to these surfaces and subsequently removed again by way of a suitable after-treatment. Chemical processes can be used for the subsequent removal of the absorbing material. Thus, the absorption layer can be removed again, for example, with the aid of an acid, such as hydrochloric acid, acetic acid, other organic carboxylic acids, methanesulfonic acid or tetrafluoroboric acid. It is also possible to use mechanical removal, for example by abrading or emerying, or to use a chemical-mechanical process.

A coating firstly applied to these two surfaces should thereby be removed again as completely as possible. Of course, however, an improvement in the primary beam transparency is also achieved in the case of the present method when the thickness of this coating is substantially reduced, that is to say to a layer thickness of 10% or less of the original layer thickness. The result of this in each case is that when the antiscatter grid or collimator is used in imaging medical technology the primary radiation in the region of the intermediate walls—even though possibly slightly attenuated by the relatively high transmission of the material of the base body—makes a contribution to constructing the image.

The present antiscatter grid or collimator, which can be produced using the methods presented, consequently comprises a base body of predeterminable geometry having transmission channels for primary radiation of the respective radiation type which extend between two opposite surfaces of the base body. The base body is formed from a first material which is substantially transmissive to the radiation type. Inner surfaces of the base body in the transmission channels are coated with a second material, which strongly absorbs the radiation type, up to a layer thickness which suffices to absorb virtually completely incident secondary radiation of the radiation type. The opposite surfaces of the base body are not coated, or bear only a coating of greatly reduced layer thickness made from the second material which strongly absorbs the radiation type.

BRIEF DESCRIPTION OF THE DRAWINGS

The present method will be explained again briefly below with the aid of exemplary embodiments in conjunction with the drawings, without restricting the general inventive concept.

DETAILED DESCRIPTION OF THE PREFERRED EMBODIMENTS

Figure 1:
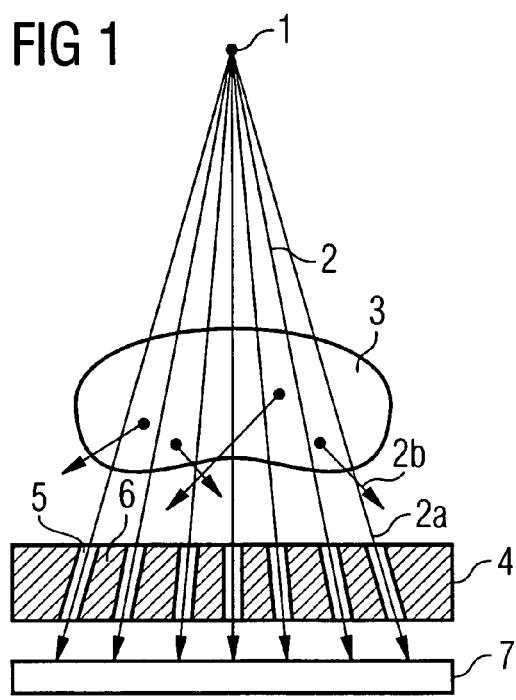
FIG. 1 schematically shows the action of an antiscatter grid when recording x-ray images of an object.

The typical situation when recording an x-ray image of an object 3 in x-ray diagnosis is represented schematically with the aid of FIG. 1. The object 3 lies between the tube focus 1 of an x-ray tube, which may be regarded as an approximately point x-ray source, and a detector surface 7. The x-rays 2 emitted from the focus 1 of the x-ray source propagate in a straight line in the direction of the x-ray detector 7, and in doing so pass through the object 3. The primary beams 2a striking the detector surface 7, which pass through the object 3 on a straight line starting from the x-ray focus 1, cause, on the detector surface 7, a positionally resolved attenuation value distribution for the object 3. Some of the x-rays 2 emitted from the x-ray focus 1 are scattered in the object 3. The scattered beams 2b created in this case do not contribute to the desired image information and, when they strike the detector 7, they significantly impair the signal-to-noise ratio.

In order to improve the image quality, an antiscatter grid 4 is therefore arranged in front of the detector 7. This antiscatter grid 4 has transmission channels 5 in a base body 6 which in this case consists of a material nontransmissive to x-radiation. The transmission channels 5 are aligned in the direction of the tube focus 1, so that they allow the incident primary radiation 2a on a straight-line path to strike the detector surface. Beams not incident in this direction, in particular the scattered beams 2b, are blocked or significantly attenuated by the absorbing material of the base body 6. However, on the basis of the previously known production techniques, the absorbing intermediate walls of the base body 6 can be produced only with a particular minimum thickness, so that a significant part of the primary radiation 2a is therefore also absorbed and does not contribute to the image result.

Figure 2:
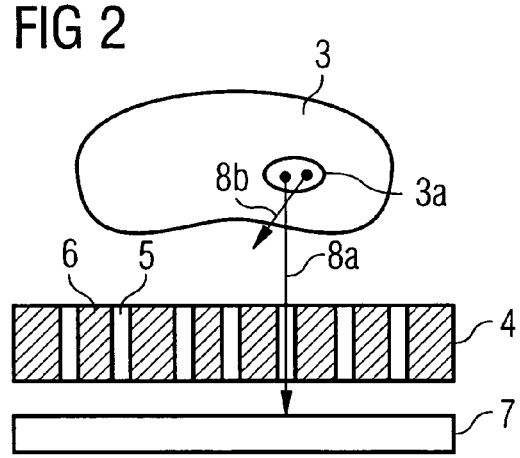
FIG. 2 schematically shows the situation when using a collimator during the nuclear medical recording of an object.

FIG. 2 shows the situation when recording images in nuclear diagnosis. The body 3 to be examined, in which an organ 3a is indicated, can be seen in the figure. By injection of a medium which emits gamma radiation, and which concentrates in the organ 3a, gamma quanta 8a are emitted from this region and strike the detector 7, an Anger camera. By use of the collimator 4 arranged in front of the detector 7, which has transmission channels 5 aligned in a straight line between regions of the base body 6 that absorb gamma radiation, the projection direction of the respective image recording is set. Gamma quanta 8b which are emitted in other directions or are scattered, and which do not arrive on a straight-line path from this projection direction, are absorbed by the collimator 4. In this technique as well, however, a significant part of the primary radiation 8a is still absorbed because the absorbing regions of the base body 6 are not arbitrarily thin.

At least one embodiment of the present invention provides a method which permits very precise manufacture of antiscatter grids or collimators with thin webs or intermediate walls between the transmission channels 5. In this case, a rapid prototyping technique is used for producing the antiscatter grid or collimator. An example of such a technique is stereolithography, as illustrated with the aid of the representation in FIG. 3.

In this technique, a UV laser beam 12 is directed onto the surface of a liquid UV-crosslinkable polymer 10, which is situated in a container 9. The UV laser beam 12 is moved, with the aid of a three-dimensional volume model of the base body 6 to be made, over the surface of the liquid polymer 10 in order to construct the base body 6 layer-wise. After a layer has been solidified, it is lowered by a further layer thickness using a construction platform 11, so that the UV laser 12 can solidify the next layer according to the three-dimensional volume model.

In this way, the base body 6 is constructed layer by layer from the crosslinked UV-cured polymer 10. Owing to the good focusability of the UV laser beam 12, very filigree structures can in this case be produced with very high accuracy. The base body 6 may be constructed directly on the construction platform 11 or on an additional support plate (not represented in the figure), which lies on the construction platform 11. Furthermore, the technique of stereolithography may also be used to construct a baseplate, on which the base body 6 is then formed according to the desired geometry.

Figure 3:
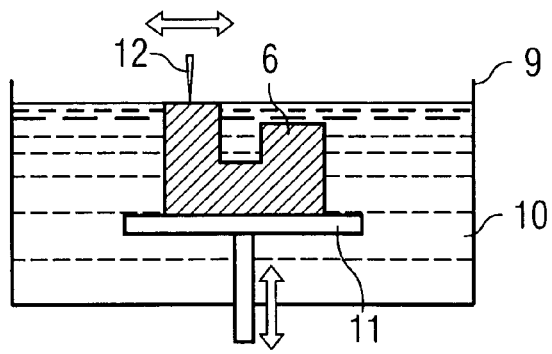
FIG. 3 shows a representation to illustrate the technique of stereolithography.

An antiscatter grid or collimator can be produced in different ways from a base body or molding produced in this way—for example in accordance with the technique of FIG. 3. An example of this is advanced in FIG. 4.

Figure 4A:
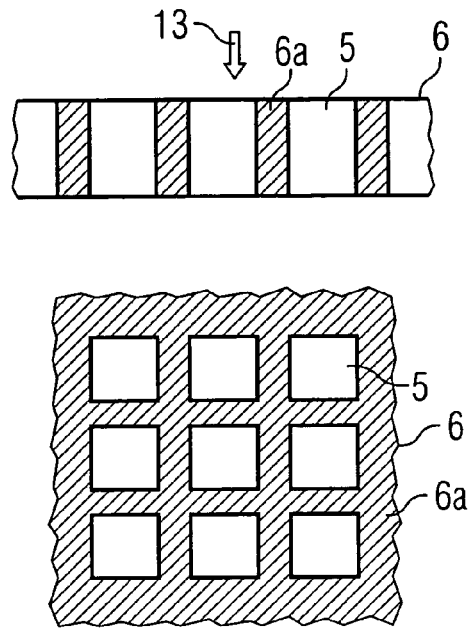
FIG. 4 schematically shows an example of the production of an antiscatter grid or collimator from a base body in accordance with an embodiment of the present method.
Figure 4B:
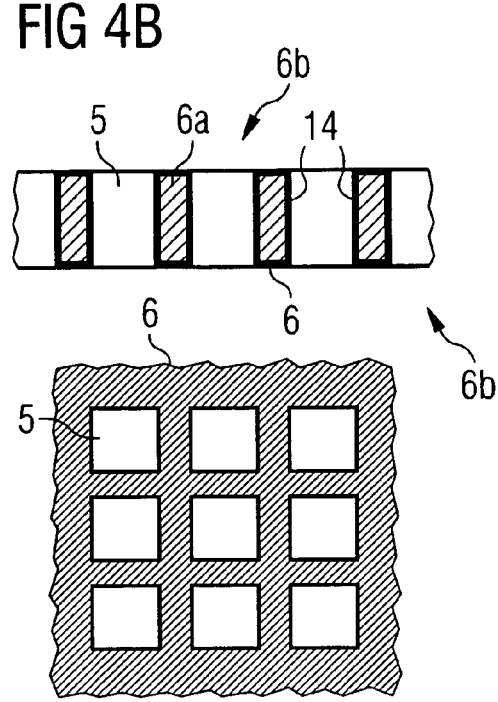

In this embodiment, a base body 6 is produced accordingly for the antiscatter grid or collimator to be made from a structural material which is substantially transmissive to x-radiation, for example a UV-cured polymer. The base body 6 is subsequently coated (coating step 13; FIG. 4a) with an absorbing material of high atomic number. Respectively to be seen in the individual part-FIGS. 4a–4d are a detail of the base body 6 with the transmission channels 5 and the intermediate walls 6a and of the antiscatter grid or collimator, respectively, in cross section in the upper part, and in plan view in the lower part. This coating step 13 results in a base body 6 with a strongly absorbing coating 14 which is applied both to the inner surfaces of the intermediate walls 6a in the transmission channels 5, and to the top side and underside 6b of the base body 6, that is to say to the end faces of the intermediate walls 6a (FIG. 4b).

Figure 4C:
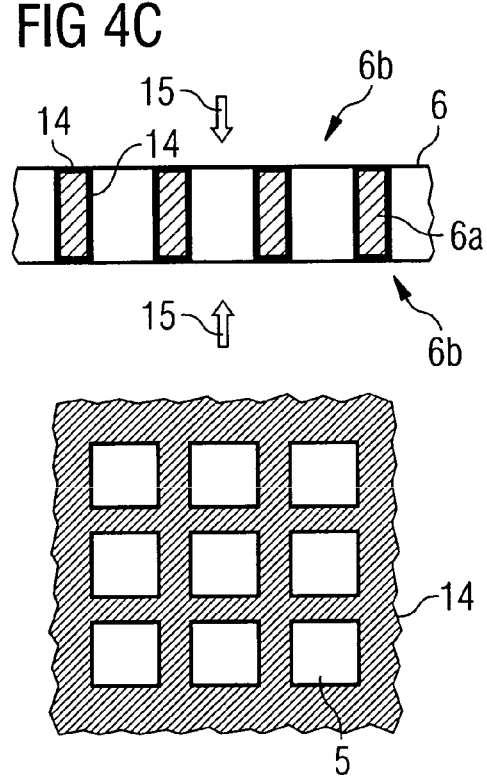
Figure 4D:
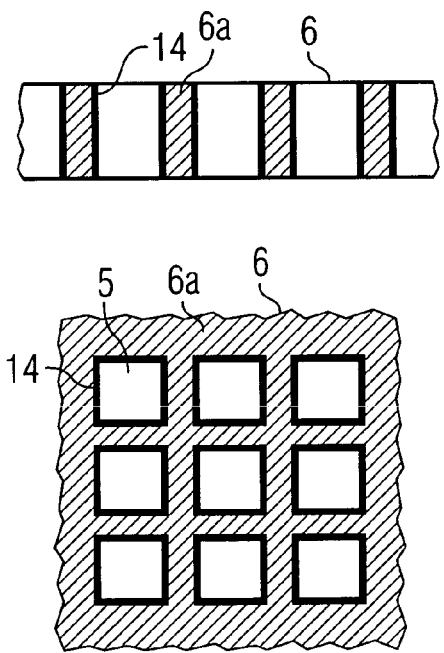

Finally, the coating 14 is removed at the end faces of the intermediate walls 6a by a chemical or mechanical method step, for example a chemical etching step 15 (FIG. 4c). An antiscatter grid or collimator is obtained in this way which has transmission channels 5 that are situated between the absorbing coatings 14 of the intermediate walls 6a of the base body 6 (FIG. 4d). The intermediate walls 6a likewise form with the coatings 14 delimiting them transmission channels for the primary radiation which have a very high aspect ratio. Slight losses of absorber material in the transmission channels 5 during a chemical abrasion method are unavoidable when removing the coating 14 on the end faces. However, this is immaterial for the functioning of the antiscatter grid or collimator as long as the abrasions are performed uniformly over the surface.

The intermediate walls 6a, illustrated in the present exemplary embodiments, of the base body 6 do not generally have the illustrated flat plateau shape at the end faces in the case of production using the rapid prototyping technique. Rather, the result is a more or less roof-shaped form whose tip is rounded. An optimum primary beam transparency arises when the absorber coating 14 in the region of these roof surfaces is completely removed. The absorber coating 14 on the inner surfaces of the transmission channels 5 runs parallel to the x-rays and therefore attenuates the primary radiation only minimally. If the end faces or roof faces are exposed, the primary beams can pass largely without attenuation to the image detector through the polymer of the base body 6. A primary beam transparency of 90% and higher can thereby be achieved. Of course, it is advantageous for this purpose if a polymer which absorbs as few x-rays as possible is used for the base body.

For application of the coating 14, a thin copper layer may, for example, firstly be applied to the surface of the base body 6 by sputtering. The thickness of this copper layer lies in the 1/10 $\mu$m range. A lead-tin alloy is finally applied to this layer by electrolytic deposition. The thickness of this alloy is designed so as to achieve the necessary absorption of the secondary radiation.

Especially for mammography applications, in which the energy of the employed x-ray spectrum is relatively low, a very thin absorber layer 14 on the structures of the base body 6 is sufficient. Merely with a 2 $\mu$m thick lead layer, for example, about 84% absorption can be obtained at average mammography x-ray energies (20 keV).

Figure 5:
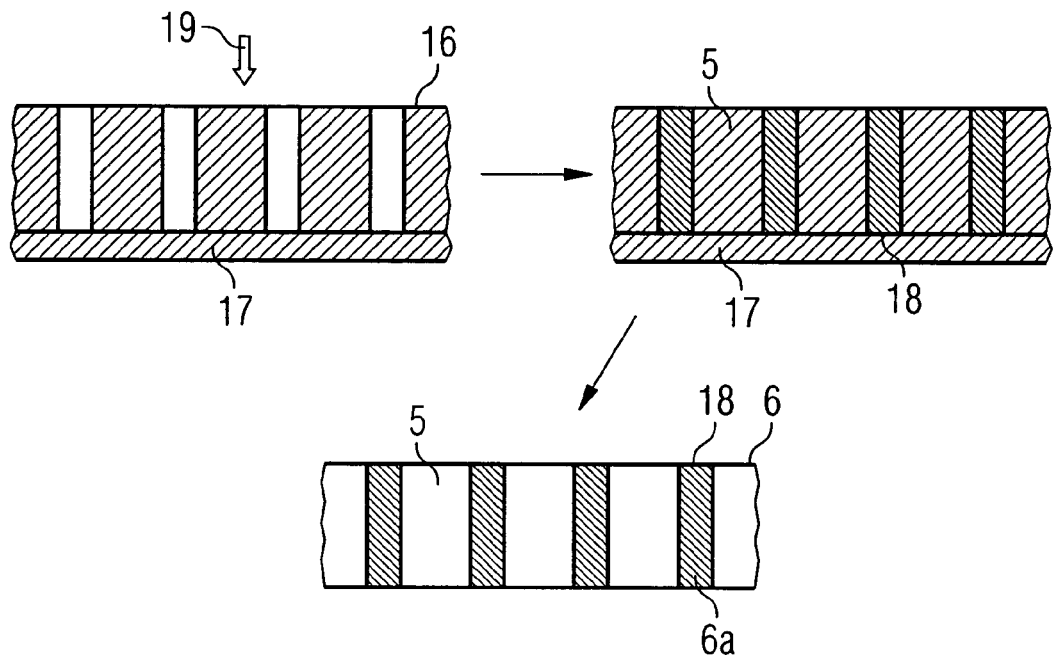
FIG. 5 schematically shows a further example of the production of the base body in the case of an embodiment of the present method.

FIG. 5 shows a further example of making an antiscatter grid or collimator in which the base body 6 is replicated from a molding 16. The molding 16 has in this case been applied to a baseplate 17 or formed with the latter. The molding 16 has been produced here according to the geometry of the transmission channels 5 of the antiscatter grid or collimator to be made, and so it constitutes a negative mold of the base body 6. Since the transmission channels 5 are not generally designed to be contiguous, the baseplate 17 is needed for making such a molding. The gaps of this molding 16 are finally filled (filling 19) with a material which is in a liquid state and is substantially transparent to x-radiation. This material 18, for example a polymer, solidifies after cooling and is separated from the molding 16 and the baseplate 17. In this way, a base body 6 is obtained which is subsequently further processed in the same way as in the example of FIG. 4.

Figure 6:
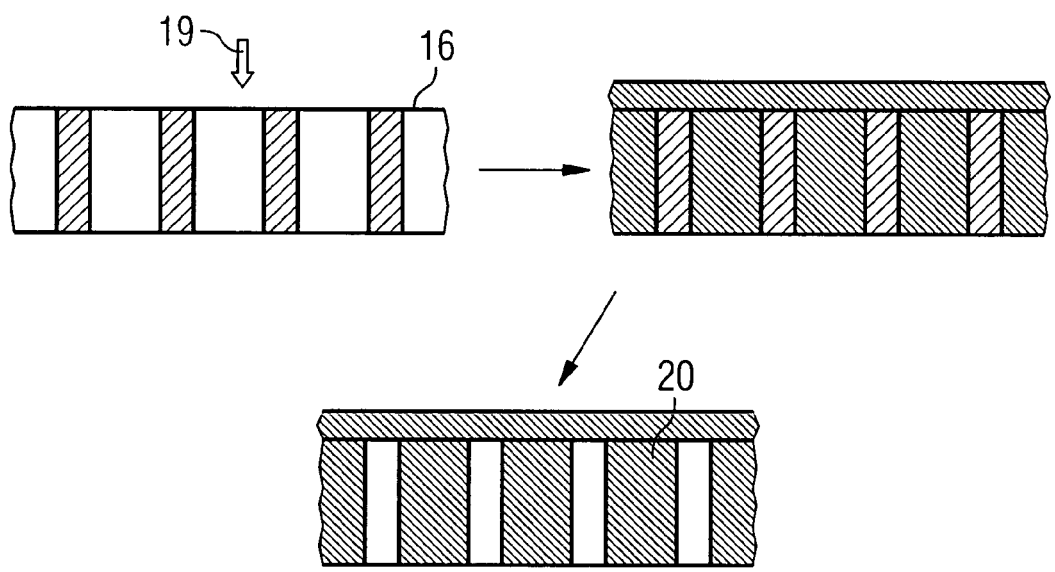
FIG. 6 schematically shows a further example of the production of the base body in the case of an embodiment of the present method.

Lastly, FIG. 6 shows a further example of making an antiscatter grid from a molding 16 produced by way of a rapid prototyping technique. In this example, the molding 16 is constructed according to the geometry of the base body 6 of the antiscatter grid or collimator. This molding 16 is subsequently replicated into a negative mold 20, for example by introducing or casting nickel, so that the material regions of the negative mold 20 correspond to the transmission regions 5 of the antiscatter grid or collimator. The base body 6 can subsequently be made from this negative mold 22 according to the procedure of FIG. 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing at least one of an antiscatter grid and collimator for a radiation type, formed from a base body of predeterminable geometry having transmission channels for primary radiation of the radiation type which extend between two opposite surfaces of the base body, comprising:

setting the geometry of the base body;
constructing the base body according to the set geometry by use of a rapid prototyping technique through layerwise solidification of a structural material, the structural material being substantially transmissive to the radiation type, under the action of radiation; and
coating inner surfaces of the base body in the transmission channels with a material, which strongly absorbs the radiation type, up to a layer thickness which suffices to absorb virtually completely incident secondary radiation of the radiation type, wherein the opposite surfaces of the base body have, at most, a coating made from the material strongly absorbing the radiation type and having a thickness not greater than the thickness of the coating on the inner surfaces.

2. The method as claimed in claim 1, wherein the aftertreatment of the opposite surfaces of the base body is performed by a chemical process for at least one of removing and reducing the coating.

3. The method as claimed in claim 2, for producing an antiscatter grid for x-radiation.

4. The method as claimed in claim 2, for producing a collimator for gamma radiation.

5. The method as claimed in claim 1, wherein the aftertreatment of the opposite surfaces of the base body is performed by a mechanical process for at least one of removing and reducing the coating.

6. The method as claimed in claim 5, for producing an antiscatter grid for x-radiation.

7. The method as claimed in claim 5, for producing a collimator for gamma radiation.

8. The method as claimed in claim 1, wherein the aftertreatment of the opposite surfaces of the base body is performed by a chemical-mechanical process for at least one of removing and reducing the coating.

9. The method as claimed in claim 8, for producing an antiscatter grid for x-radiation.

10. The method as claimed in claim 8, for producing a collimator for gamma radiation.

11. The method as claimed in claim 1, wherein the method of stereolithography is used as the rapid prototyping technique for at lest one of construction of the base body and molding.

12. The method as claimed in claim 1, wherein the coating is performed by at least one of sputtering, vapor deposition and electrolytic deposition.

13. The method as claimed in claim 1, wherein the geometry of the base body is set in such a way that at least one of a focused antiscatter grid and collimator is formed.

14. The method as claimed in claim 1, for producing an antiscatter grid for x-radiation.

15. The method as claimed in claim 1, for producing a collimator for gamma radiation.

16. A method for producing at least one of an antiscatter grid and collimator for a radiation type, formed from a base body of predeterminable geometry having transmission channels for primary radiation of the radiation type which extend between two opposite surfaces of the base body, comprising:

setting the geometry of the base body;
constructing a molding according to at least one of the set geometry of the base body and a negative mold thereof by use of a rapid prototyping technique through layerwise solidification of a structural material under the action of radiation;
producing at least a single replication of the molding in order to form the base body from a material which is substantially transmissive to the radiation type; and
coating the base body with a material, which strongly absorbs the radiation type, up to a layer thickness which suffices to absorb virtually completely incident secondary radiation of the radiation type, wherein the opposite surfaces of the base body have, at most, made from the material strongly absorbing the radiation type and having a thickness not greater than the thickness of the coating on the inner surfaces.

17. The method as claimed in claim 16, wherein the aftertreatment of the opposite surfaces of the base body is performed by a chemical process for at least one of removing and reducing the coating.

18. The method as claimed in claim 16, wherein the aftertreatment of the opposite surfaces of the base body is performed by a mechanical process for at least one of removing and reducing the coating.

19. The method as claimed in claim 16, wherein the aftertreatment of the opposite surfaces of the base body is performed by a chemical-mechanical process for at least one of removing and reducing the coating.

20. The method as claimed in claim 16, wherein the method of stereolithography is used as the rapid prototyping technique for at lest one of construction of the base body and molding.

21. The method as claimed in claim 16, wherein the coating is performed by at least one of sputtering, vapor deposition and electrolytic deposition.

22. The method as claimed in claim 16, wherein the geometry of the base body is set in such a way that at least one of a focused antiscatter grid and collimator is formed.

23. The method as claimed in claim 16, for producing an antiscatter grid for x-radiation.

24. The method as claimed in claim 16, for producing a collimator for gamma radiation.

25. An antiscatter grid for a radiation type, comprising:
a base body of predeterminable geometry including transmission channels for primary radiation of the radiation type which extend between two opposite surfaces of the base body, the base body being formed from a first material which is substantially transmissive to the radiation type, wherein inner surfaces of the base body are coated in the transmission channels with a second material which strongly absorbs the radiation type up to a layer thickness which suffices to virtually completely absorb incident secondary radiation of the radiation type, and wherein the opposite surfaces of the base body bear, at most, only a coating which is made from the second material, strongly absorbing the radiation type, and wherein the coating on the opposite surfaces of the base body has a layer thickness, which is less than the layer thickness of the second material on the inner surfaces.

26. The antiscatter grid as claimed in claim 25, wherein the first material is a polymer material.

27. The antiscatter grid as claimed in claim 26, wherein the base body has a geometry with the aid of which a focused antiscatter grid is formed.

28. The antiscatter grid as claimed in claim 25, wherein the base body has a geometry with the aid of which a focused antiscatter grid is formed.

29. The antiscatter grid as claimed in claim 25, wherein the second material strongly absorbs x-radiation, and the first material is substantially transmissive to x radiation.

30. The antiscatter grid as claimed in claim 25, wherein the second material strongly absorbs gamma radiation, and the first material is substantially transmissive to gamma radiation.

31. The anti-scatter grid of claim 25, wherein the opposite surfaces of the base body are not coated with the second material.

32. A collimator for a radiation type, comprising:
a base body of predeterminable geometry including transmission channels for primary radiation of the radiation type which extend between two opposite surfaces of the base body, the base body being formed from a first material which is substantially transmissive to the radiation type, wherein inner surfaces of the base body are coated in the transmission channels with a second material which strongly absorbs the radiation type up to a layer thickness which suffices to virtually completely absorb incident secondary radiation of the radiation type, and wherein the opposite surfaces of the base body bear, at most, only a coating which is made from the second material, strongly absorbing the radiation type, and wherein the coating on the opposite surfaces of the base body has a layer thickness, which is less than the layer thickness of the second material on the inner surfaces.

33. The collimator as claimed in claim 32, wherein the first material is a polymer material.

34. The collimator as claimed in claim 33, wherein the base body has a geometry with the aid of which a focused collimator is formed.

35. The collimator as claimed in claim 32, wherein the base body has a geometry with the aid of which a focused collimator is formed.

36. The collimator as claimed in claim 32, wherein the second material strongly absorbs x-radiation, and the first material is substantially transmissive to x radiation.

37. The collimator as claimed in claim 32, wherein the second material strongly absorbs gamma radiation, and the first material is substantially transmissive to gamma radiation.

38. The collimator of claim 32, wherein the opposite surfaces of the base body are not coated with the second material.

* * * * *